(12) United States Patent
McLean et al.

(10) Patent No.: US 7,241,525 B2
(45) Date of Patent: Jul. 10, 2007

(54) FUEL CELL LAYER WITH REACTOR FRAME

(75) Inventors: Gerard Francis McLean, West Vancouver (CA); Duhane Lam, Vancouver (CA); Olen Vanderleeden, Coquitlam (CA)

(73) Assignee: Angstrom Power Inc., North Vancouver, British Columbia ( * ) Notice: Subject to any disclaimer, the term of this patent is extended or adjusted under 35 U.S.C. 154(b) by 0 days.

(21) Appl. No.: 10/818,843

(22) Filed: Apr. 6, 2004

(65) Prior Publication Data

US 2005/0221157 A1  Oct. 6, 2005

(51) Int. Cl.
*H01M 8/02* (2006.01)
*H01M 8/24* (2006.01)

(52) U.S. Cl. .............. 429/32; 429/34; 429/38; 429/40

(58) Field of Classification Search ............ 429/34, 429/35, 38, 39, 32, 40
See application file for complete search history.

(56) References Cited

U.S. PATENT DOCUMENTS

| 3,634,140 A | 1/1972 | Von Krusenstierna .... 136/86 B |
| 5,252,410 A | 10/1993 | Wilkinson .............. 429/33 |
| 5,364,711 A | 11/1994 | Yamada ................ 429/15 |

(Continued)

FOREIGN PATENT DOCUMENTS

EP   0585049   8/1993

(Continued)

OTHER PUBLICATIONS

Wainwright, et al. "A Microfabricated Hydrogen/Air Fuel Cell" 195 Meeting of the Electrochemical Society, Seattle, WA ,1999.

*Primary Examiner*—Tracy Dove
(74) *Attorney, Agent, or Firm*—Schwegman, Lundberg, Woessner & Kluth, P.A.

(57) ABSTRACT

The present invention relates to a fuel cell layer with frames with a central axis comprising: at least a first and second unit fuel cell, wherein the first and second unit fuel cells are disposed adjacent each other to form a front side and back side of the fuel cell layer; a front plenum comprising fuel communicating with the front side; and a back oxidant plenum comprising fuel communicating with the back side, and wherein each unit fuel cell comprises: a front and back process layer; a front and back cavity formed between the back process layers and the front process layer of adjacent unit fuel cells; a front perimeter barrier disposed on the back process layer substantially surrounding the back cavity; and a back perimeter barrier disposed on the front process layer substantially surrounding the front cavity and wherein the front cavity is in communication with the front side and the back cavity is in communication with the back side and wherein at least one of process layers facilitates a transport process between the reactant plenums; and wherein at least one of the unit fuel cells comprise at least one frame formed from one of the process layers, at least one of the perimeter barriers, and at least one of the cavities; and a process layer; at least one perimeter barrier disposed on the process layer; and at least one cavity formed in each reactor frame, wherein each cavity is in communication with one side of the fuel cell layer, and wherein at least one of the process layers transports ions between the plenums.

63 Claims, 8 Drawing Sheets

U.S. PATENT DOCUMENTS

| | | | |
|---|---|---|---|
| 5,480,738 A | 1/1996 | Elangovan | 429/32 |
| 5,508,128 A | 4/1996 | Akagi | 429/30 |
| 5,631,099 A | 5/1997 | Hockaday | 429/30 |
| 5,672,439 A | 9/1997 | Wilkinson | 429/40 |
| 5,759,712 A | 6/1998 | Hockaday | 429/30 |
| 5,861,221 A | 1/1999 | Ledjeff | 429/32 |
| 5,925,477 A | 7/1999 | Ledjeff | 429/32 |
| 5,989,741 A | 11/1999 | Bloomfield | 429/32 |
| 6,060,188 A | 5/2000 | Muthuswamy | 429/31 |
| 6,127,058 A | 10/2000 | Pratt | 429/30 |
| 6,387,557 B1 | 5/2002 | Krasij | 429/32 |
| 6,620,542 B2 | 9/2003 | Pan | 429/41 |
| 6,740,444 B2 | 5/2004 | Leban | 429/41 |
| 6,830,736 B1 | 12/2004 | Lamla | 422/211 |

FOREIGN PATENT DOCUMENTS

| | | |
|---|---|---|
| EP | 0 823 743 | 7/1997 |
| EP | 0823743 | 8/1997 |
| GB | 2339058 | 1/2000 |
| JP | 8050903 | 2/1996 |
| WO | PCT/US01/11763 | 12/2001 |
| WO | PCT/US02/00063 | 1/2002 |
| WO | PCT/US02/17434 | 6/2002 |

FUEL CELL LAYER WITH REACTOR FRAME

FIELD

The present invention relates to a fuel cell assembly made of one or more unit fuel cells, wherein at least one unit fuel cell has at least one reactor frame. Each reactor frame has a process layer that facilitates a transport process between the reactant plenums in the reactor.

BACKGROUND

Fuel cells are comprised of chemical reactors. The size of the chemical reactors put constraints on the ability to reduce the size of a fuel cell to micro-dimensions.

Existing fuel cells generally are a stacked assembly of individual fuel cells, with each stack producing high current at low voltage. The typical reactor construction involves reactant distribution and current collection devices brought into contact with a layered electrochemical assembly consisting of a gas diffusion layer, and a first catalyst layer. With the exception of high temperature fuel cells, such as molten carbonate cells, most proton exchange membrane, direct methanol, solid oxide or alkaline fuel cells have a layered planar structure where the layers are first formed as distinct components and then assembled into a functional fuel cell stack by placing the layers in contact with each other.

One major problem with the layered planar structure fuel cell has been that the layers must be held in intimate electrical contact with each other, which if intimate contact does not occur the internal resistance of the stack increases, which decreases the overall efficiency of the fuel cell.

A second problem with the layered planar structured fuel cell has been that with larger surface areas, problems occur to maintain consistent contact with both cooling and water removal in the inner recesses of the layered planar structured fuel cell. Also, if the overall area of the cell becomes too large then there are difficulties creating the contacting forces needed to maintain the correct fluid flow distribution of reactant gases over the electrolyte surface.

Existing devices also have the feature that with the layered planar structure fuel cell since both fuel and oxidant are required to flow within the plane of the layered planar structured fuel cell, at least 4 and up to 6 distinct layers have been required to form a workable cell, typically with a first flowfield, a first gas diffusion layer, a first catalyst layer, a first electrolyte layer, a second catalyst layer, a second gas diffusion layer, a second flowfield layer and a separator. These layers are usually manufactured into two separate fuel cell components and then a fuel cell stack is formed by bringing layers into contact with each other. When contacting the layers, care must be taken to allow gas diffusion within the layers while preventing gas leaking from the assembled fuel cell stack. Furthermore, all electrical current produced by the fuel cell in the stack must pass through each layer in the stack, relying on the simple contacting of distinct layers to provide an electrically conductive path. As a result, both sealing and conductivity require the assembled stack to be clamped together with significant force in order to activate perimeter seals and reduce internal contact resistance.

Electrical energy created in the fuel cell has to travel between layers of material compressed together before it can be used. These layers include membrane electrode assemblies, gas diffusion layers, and separator plates. The resistance to the transfer of electrical energy through each layer and between layers also affects the performance of the fuel cell. The contact pressure and contact area that can be achieved between the layers of the fuel cell stack are directly proportional to the conductivity of these components and hence the performance of the fuel cell stacks.

Laying out layers of material and compressing them together using the brute force approach of traditional fuel cell stacks is inefficient and expensive. In addition, such designs suffer from long term performance degradation because of thermal and mechanical cycles that occur during the operation of the fuel cells. A need has existed for less expensive and more efficient fuel cell layers.

In manufacturing fuel cell stack assemblies using this typical layering approach of all the components, it is difficult to accurately align the layers. Inaccurate alignment has a detrimental effect on the performance and durability of the fuel cell stacks.

A need has existed for a micro, or small fuel cells having high volumetric power density. A need has existed for micro fuel cells capable of low cost manufacturing because of having fewer parts than the layered planar structure fuel cell. A need has existed for a micro fuel cell having the ability to utilize a wide variety of electrolytes. A need has existed for a micro fuel cell, which has substantially reduced contact resistance within the fuel cell. A need has existed for a micro fuel cell, which has the ability to scale to high power has long been desired. A need has existed for micro fuel cells having larger reactant surface areas. A need has existed for fuel cells capable of being scaled to micro-dimensions. A need has existed for fuel cells capable of being connected together without the need for external components for connecting the fuel cells together.

A need has existed for a compact fuel cell with high aspect ratio cavities. The aspect ratio of the fuel cell is defined as the ratio of the fuel cell cavity height to the width. Increasing this aspect ratio is beneficial for increasing the efficiency of the fuel cell.

A need has existed to develop fuel cells topologies or fuel cell architectures that allow increased active areas to be included in the same volume, i.e. higher density of active areas. This will allow fuel cells to be optimized in a manner different than being pursued by most fuel cell developers today.

SUMMARY

The present fuel cell assembly has a central axis that includes one or more unit fuel cells, a front fuel plenum, and a back oxidant plenum. A first and a second unit fuel cell are disposed adjacent to each other to form a front side and a back side of the fuel cell assembly. The front fuel plenum communicates with the front side, and the back oxidant plenum communicates with the back side.

Each unit fuel cell is made of a front and back process layer, a front and back cavity, and a front and back perimeter barrier. The front cavity is formed between the front and back process layers and a back cavity formed between the back process layers.

A front perimeter barrier is disposed on the back process layer substantially surrounding the back cavity and a back perimeter barrier disposed on the front process layer substantially surrounding the front cavity. The front cavity is in communication with the front side and the back cavity is in communication with the back side.

At least one of the process layers facilitates a transport process between the fuel and oxidant plenums and wherein at least one of the unit fuel cells comprises at least one frame formed from one of the process layers; at least one of the perimeter barriers, at least one of the cavities. Each cavity is in communication with one side of the fuel cell assembly and the process layer facilitates a transport process between the plenums.

Each unit fuel cell is made of one or more reactor frames. The reactor frames include one or more of the process layers, one or more of the perimeter barriers disposed on the process layer, and one or more cavities are formed in each reactor frame. The resulting assemblage is configured so the cavities are in communication with one side of the fuel cell assembly.

The fuel cell assembly can be attached to an electrical appliance. The fuel cell assembly is a source of power for running the electrical appliances.

BRIEF DESCRIPTION OF THE DRAWINGS

In the detailed description of the preferred embodiments presented below, reference is made to the accompanying drawings.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that it can be practiced or carried out in various ways.

The use of frames in the fuel cell assembly simplifies the overall design, reduces the number of components needed in construction, and simplifies the construction steps needed to make the assembly. The frame construction also increases the precision of alignment between process layers and perimeter barriers used in the unit fuel cells.

When composite frames are used, the frame based design simplifies the task of sealing layers by only having to bond similar materials to each other.

Figure 1:
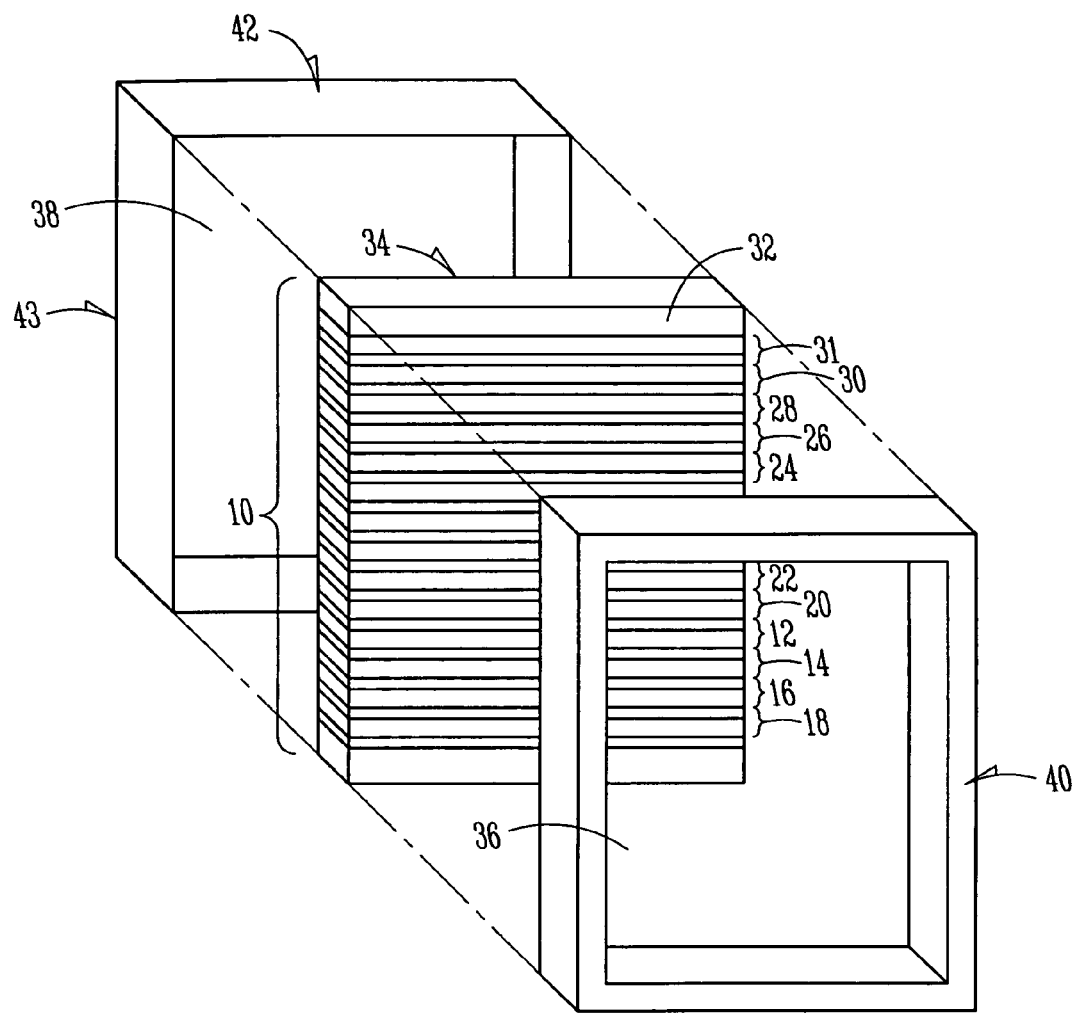
FIG. 1 depicts a front perspective view of a thin flat construction of the fuel cell assembly.

With reference to the Figures, FIG. 1 is a front perspective view of a fuel cell assembly (10). FIG. 1 depicts a thin flat construction embodiment of the fuel cell assembly.

Figure 2:
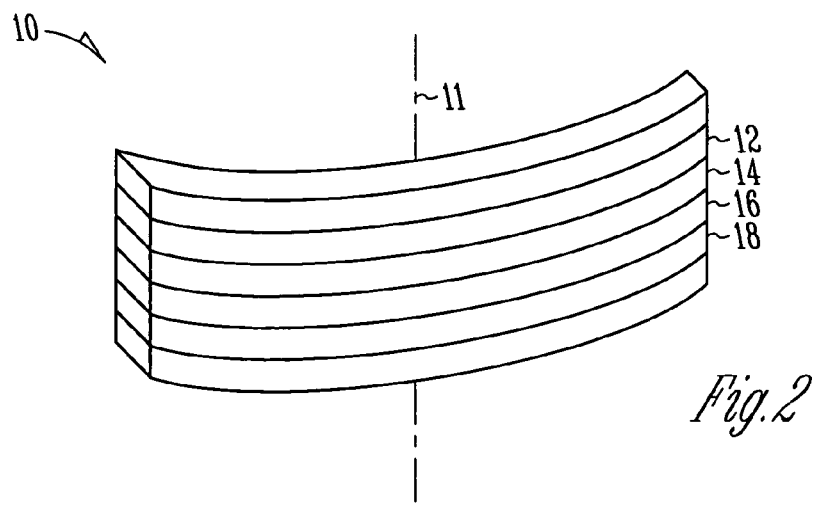
FIG. 2 depicts a curvilinear fuel cell assembly.

FIG. 2 depicts a thin curvilinear embodiment of the fuel cell assembly (10). Throughout the figures, the fuel cell assembly (10) is depicted having a central axis (11).

FIG. 1 shows a thin flat fuel cell assembly (10) with at least 10 unit fuel cells (12, 14, 16, 18, 20, 22, 24, 26, 28, 30, 31) having an overall dimension which is between 1 centimeter and 10 centimeters in length, between 5 millimeters and 80 millimeters in width, and about 0.5 millimeters to 4 millimeters in thickness, with each unit fuel cell having 2 process layers. Each process layer can be formed from two or more thin layers that are placed in contact with each other.

FIG. 2, which shows a curvilinear version of a fuel cell assembly (10) of the invention, having multiple unit fuel cells, (12, 14, 16, and 18).

Figure 3:
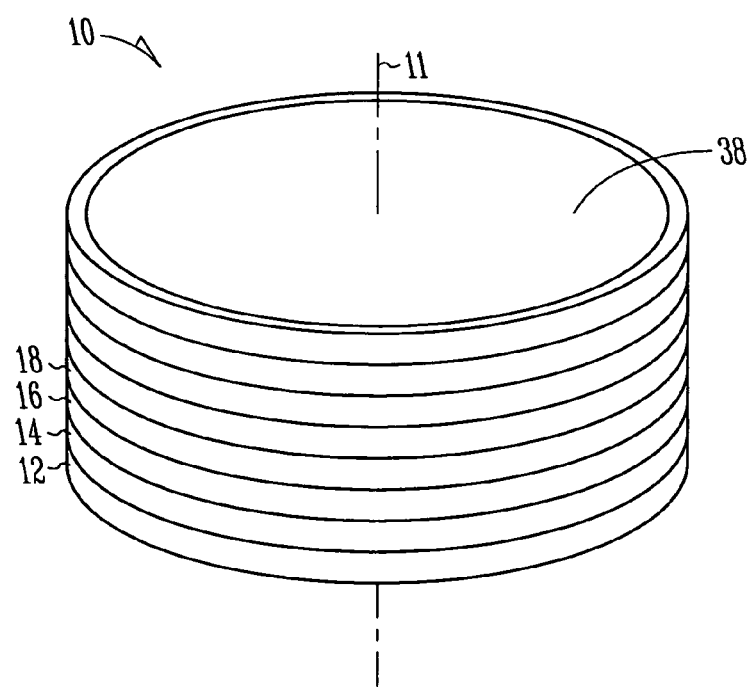
FIG. 3 depicts an embodiment where the unit fuel cells are in a cylindrical shape and are oriented perpendicular to the axis of the fuel cell assembly.

FIG. 3 is a cylindrical version of a fuel cell assembly (10) with an overall diameter between 1 centimeter and 5 centimeters and a height of between 5 millimeters and 80 millimeters and a thickness between 0.5 millimeters and 5 millimeters. Other shapes besides a cylindrical shape can be used. As an alternative, the fuel cell assembly (10) can be a prismatic shape, a boxlike shape or an irregular three dimensional shape.

The fuel cell assembly (10) can have a variable thickness; variable thickness can mean that one individual unit fuel cell can be thicker than an adjacent unit fuel cell.

The fuel cell assembly (10) is constructed of two or more unit fuel cells. The design of the fuel cell assembly (10) can range from 2 unit fuel cells to 50,000 or more unit fuel cells to be adjoined to create the fuel cell assembly. Preferably, between 2 unit fuel cells and 300 unit fuel cells are used in the fuel cell assembly with a preferred embodiment of between 2 unit fuel cells and 100 unit fuel cells. FIG. 1 in particular shows a fuel cell assembly with 11 unit fuel cells (12, 14, 16, 18, 20, 22, 24, 26, 28, 30, 31) connected together. The first unit fuel cell is (12), a second unit fuel cell (14) and nine other unit fuel cells (16, 18, 20, 22, 24, 26, 28, 30, and 31).

The first and second unit fuel cells are disposed adjacent each other and form a front side (34) and a back side (32) for the fuel cell assembly. The back side (32) communicates with an oxidant plenum (36) and the front side (34) communicates with a fuel plenum (38). In another version, the unit fuel cells (12, 14, 16, 18, 20, 22, 24, 26, 28, 30, 31) can be oriented to form the fuel plenum (38).

The fuel cell assembly (10) includes the oxidant plenum (36) and the fuel plenum (38). The oxidant plenum (36) is enclosed by a structure (40). The structure can either be a closed container or open to ambient atmosphere. FIG. 1 depicts an embodiment of the structure (40) open to ambient atmosphere. When the oxidant plenum (36) is open to the atmosphere the enclosing structure (40) is optional. The structure (40) when open to the atmosphere, adds structural support to the oxidant plenum (36).

The fuel plenum (38) is enclosed by a device (42) which is similar to structure (40). The device (42) can be a closed container or open to ambient atmosphere. When the device (42) is open to the atmosphere, it adds structural support to the fuel plenum (38). FIG. 1 depicts an embodiment wherein the device (42) is a closed container with a solid back wall (43).

In the fuel cell assembly (10) embodiment depicted in FIG. 3, the unit fuel cells (12, 14, 16, and 18) are disposed roughly parallel to each other and then the unit fuel cells are disposed horizontally around the central axis (11) and fuel plenum (38).

Figure 4:
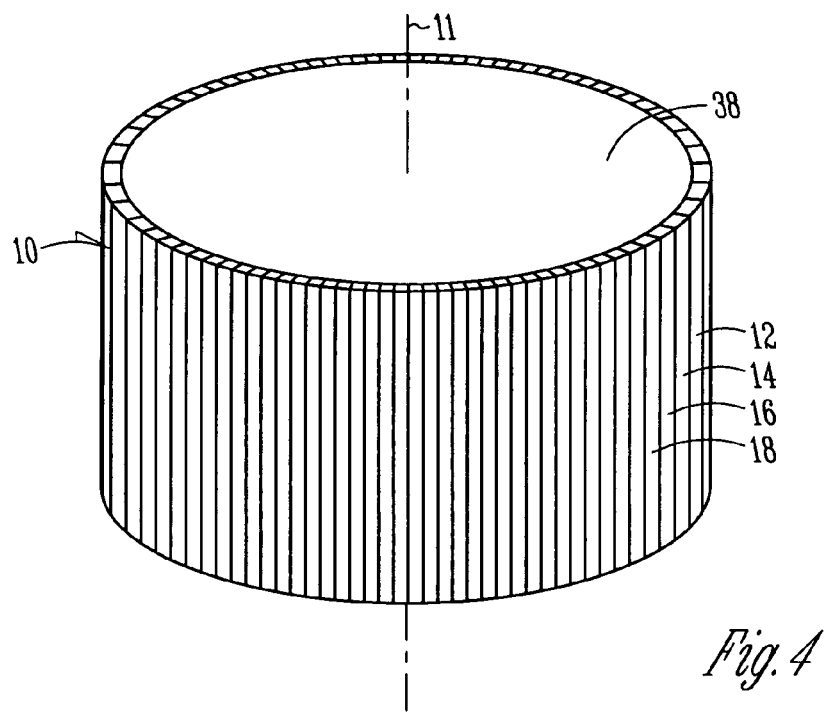
FIG. 4 depicts another embodiment where the unit fuel cells are parallel to the axis of the fuel cell assembly.

FIG. 4 depicts a fuel cell assembly (10) embodiment where the unit fuel cells (12, 14, 16, and 18) are disposed roughly parallel to each other and then the unit fuel cells are disposed vertically around the central axis (11) and fuel plenum (38).

Figure 5:
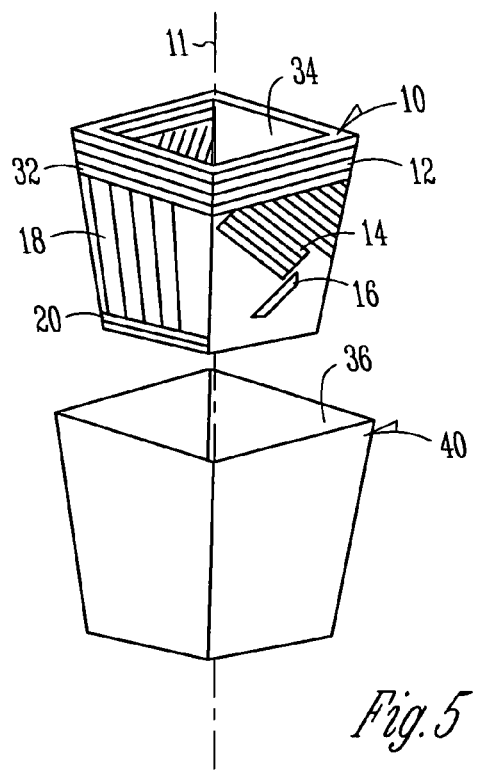
FIG. 5 depicts unit fuel cells at arbitrary angles to each other and the fuel cell assembly having an irregular three dimensional shape.

FIG. 5 depicts a fuel cell assembly (10) embodiment wherein the unit fuel cells (12, 14, 16, 18, and 20) are disposed roughly parallel to each other but at an arbitrary angle to the central axis (11) and at arbitrary angles relative to other unit fuel cells. The unit fuel cells can be disposed in groups wherein the unit fuel cells are parallel to each other, and then each group can be disposed at an arbitrary angle to adjacent groups. Also shown in FIG. 5 is an assembly front side (34), an assembly back side (32), an oxidant plenum (36), and a structure (40) for supporting the oxidant plenum (36).

Figure 6:
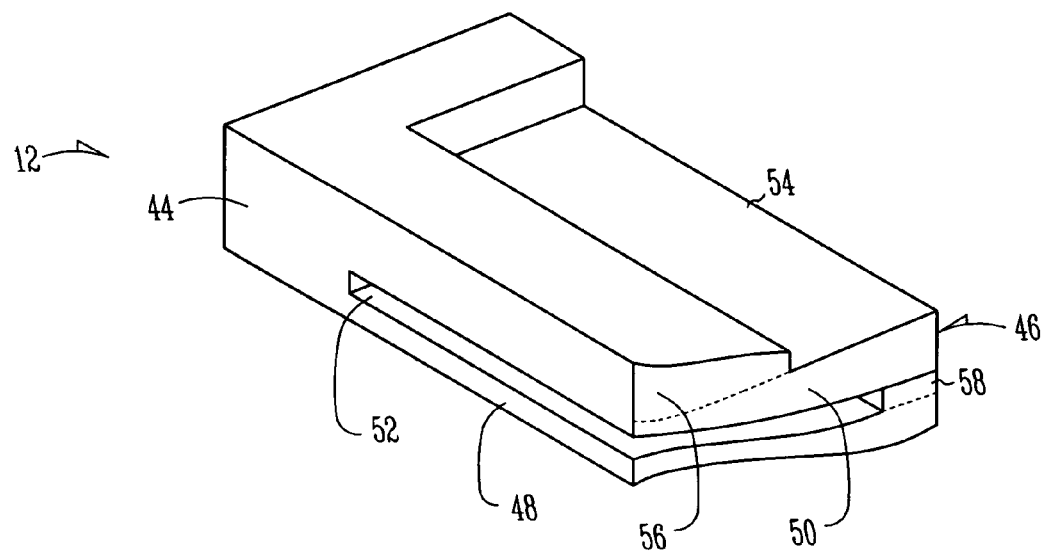
FIG. 6 depicts a cutaway perspective view of a unit fuel cell.

FIG. 6 depicts a cutaway perspective view of one embodiment of an individual unit fuel cell (12). The unit fuel cell (12) comprises a front process layer (48) and a back process layer (50). The process layers (48 and 50) are shown in this embodiment as thin sheets with each process layer having, preferably, a thickness between 1 nanometer and 2 centimeters. As an alternative, the one or more of the process layers (48, 50) can have a thickness different from another process layer. It is contemplated that the process layers may not be thin sheets. It is also contemplated that the thin sheets can be made from one of a variety of materials.

The process layer material could be an electrolyte, an ion exchange membrane, an electrical conductor, and combinations of these. For example, a workable ion exchange membrane would be Nafion™ available from E.I. DuPont DeNamours of Wilmington, Del.

An electrical conductor which is contemplated for use in the invention would be a thin film of metal, such as copper, stainless steel, aluminum or tin, or a silver filled epoxy such as model number TF12202 from Tech Film of Peabody, Mass.

Alternatively, each process layer can be made of a filled metal composite, a filled micro-structure of polymer, filled epoxy composite, graphite composite, or combinations of these materials. Filled metal composites would be a stainless steel filled with carbon, such as those available from Angstrom Power Inc. of Vancouver, Canada. Filled microstructures of polymers include Primea™ membrane available from Gore Industries of Elktown, Md. Filled epoxy composites include those available from Tech Film of Peabody, Mass. Graphite composites include Grafoil™ available from Graftek of Wilmington, Del.

It is also contemplated that the fuel cell assembly can have a first process layer (e.g., front process layer (48)) that performs a different process from the second process layer (e.g., back process layer (50)), for example, the first process layer can be an electrolyte and the second process layer can be an electrical conductor.

At least one process layer must be ionically conductive in order to facilitate the transport of ions. Optionally, at least one process layer may be made electronically conductive to transport electrons between fuel cells. The ion transporting process layer can be made from a proton exchange membrane, an electrolyte filled micro-porous structure, a liquid electrolyte trapped in a mesh, and combinations of these. The electron transporting process layer can be made from an electrical conductor, a filled metal composite, a filled microstructure of a polymer, a filled epoxy composite, a graphite composite, or combinations thereof. In both cases, the process layer should be for a gas barrier to prevent the mixing of fuel and oxidant uncontrollably.

Returning to FIG. 6, each individual unit fuel cell (12) has a front cavity (52) and a back cavity (54). The cavities (52 and 54) are formed between the front and back process layers (48 and 50). Each individual unit fuel cell includes a front perimeter barrier (56) and a back perimeter barrier (58). The front perimeter barrier (56) is located on the back process layer (50) substantially surrounding the back cavity (54). The front perimeter barrier (56) can optionally completely enclose the back cavity (54). Likewise, the back perimeter barrier (58) is located on the front process layer (48) substantially surrounding the front cavity (52). The back perimeter barrier (58) can optionally completely enclose the front cavity (52).

The perimeter barriers ensure that reactant from one reactant plenum which connects to one of the cavities, does not migrate into another reactant plenum which connects to the other cavity. More specifically, when the fuel cell assembly functions with fuel cells as the unit fuel cells, with oxidant in one of the reactant plenums and fuel in the other reactant plenum, the perimeter barriers prevent the uncontrolled mixing of fuel and oxidant.

The perimeter barriers keep the reactant from migrating by the material and/or the form of the perimeter barriers. Usable materials for the perimeter barriers include metal, such as stainless steel; silicone such as RTV™ those available from Dow Corning of Midland, Mich.; a rubber in the form of seals such as those available from the Apple Rubber Company of Lancaster, N.Y.; a polyamide, such as nylon, such as a nylon 6 or a nylon 6,6 available from DuPont; synthetic rubber such as BUNA available from Edegem, Belgium; epoxy, such as those available from EPO Tech of Billerica, Mass.; polytetrafluoroethylene, also available as Teflon™ from various sources; polyvinyldiflouride, known as Kynar™, available from Atofina Chemicals of Philadelphia, Pa.; composites thereof, laminates thereof, alloys thereof, and blends thereof. Usable forms for the perimeter barriers include micro-structures or three-dimensional structures that create a tortuous path for the reactant. In some cases, the perimeter barriers can employ both the use of materials and form to prevent the migration of the reactant to another reactant plenum.

One or more of the cavities can be filled partially or completely with a material to aid in the transport of reactant, by-product of the reaction caused by the reactants, or transport of attributes of reactant. A porous media, such as those available from Angstrom Power Inc. of Vancouver, Canada can be used to partially or completely fill the cavities. In a preferred embodiment, the cavity is filled 100% with the porous media although the cavity can be filled as little as 5% with the porous media.

Continuing with FIG. 6, the back perimeter barrier (58) forms an assemblage with a front face (44) and a back face (46). The front cavity (52) communicates with the front side (34) of the fuel cell assembly which was shown in FIG. 1. The back cavity (54) communicates with the back side (32) of the fuel cell assembly also shown in FIG. 1.

Examples of fuels usable include hydrogen, liquid phase hydrocarbons, gas phase hydrocarbons, by-products of the reaction and combinations of these. Hydrogen is a typical fuel reactant when coupled with oxygen as the oxidant. Liquid phase hydrocarbons which can serve as reactants include methanol, ethanol, butanol, and formic acid. Gas phase hydrocarbons include propane, butane, methane, and combinations of these.

A typical fuel cell assembly has an overall length between 1 millimeter and 100 centimeters; an overall width of the fuel cell assembly is between 1 millimeter and 50 centimeters; and an overall thickness between the front face and the back face of the fuel cell assembly is between 100 nanometers and 5 centimeters.

The fuel cell assembly provides high surface area process layers which are in communication with the reactant plenums through the front (52) or back cavities (54). The front (52) or back (54) cavities have high aspect ratios, wherein the distance from the front (44) or back (46) face to the opposite side of the cavity is much larger than the height of the front (56) or back (58) perimeter barrier.

The reactor preferably is made wherein the aspect ratio of at least one cavity is >1 cm/cm, more preferably is between 1 cm/cm and 100 cm/cm and most preferably is between 2.5 cm/cm and 15 cm/cm.

The selection of the aspect ratios of the cavities must be carefully chosen to accommodate the properties of the porous media which has been utilized in the cavities. For example, the transport of fuel and oxidant from the plenums to the gas diffusion electrode formed in the cavities is primarily by diffusion the aspect ratio must be maintained so that the concentration of reactants is sufficiently large to sustain the reactions throughout the electrode. At least one low aspect ratio cavity can be at least partially filled with a catalyst to promote the function of the fuel cell.

In operation reactants move from the reactant plenums into the front (52) or back (54) cavities of the unit fuel cells (e.g., (12)) to come into contact with the process layers (48 and 50). In a preferred embodiment the reactants move in and out of the cavities through diffusion only.

In an alternative embodiment the reactant transport into and out of the cavities is aided by forced convection or by the forced flow through a micro-structure embedded within at least one of the front (52) or back (54) cavities.

Figure 7:
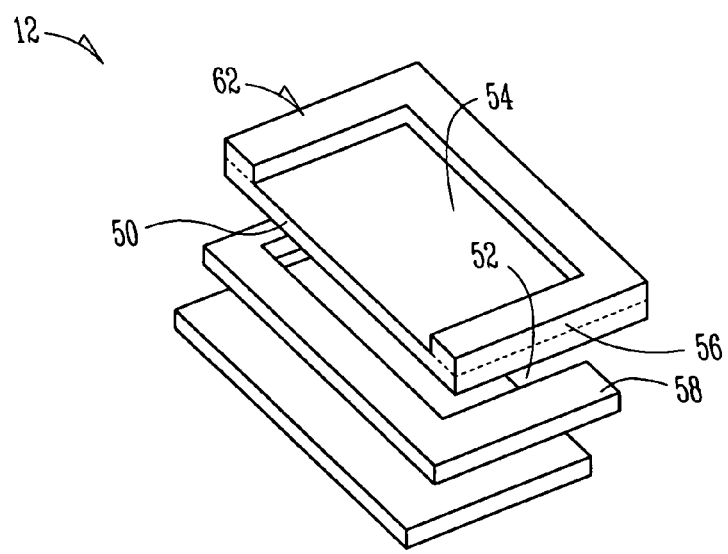
FIG. 7 depicts an exploded perspective view of a unit fuel cell with one frame.

FIG. 7 depicts an exploded perspective view of a unit fuel cell (12) with one frame (62). The frame (62) is formed by a process layer (50), a perimeter barrier (56), and a formed cavity (54). Also shown in FIG. 7 is a second cavity (52) and a second perimeter barrier (58).

Figure 8:
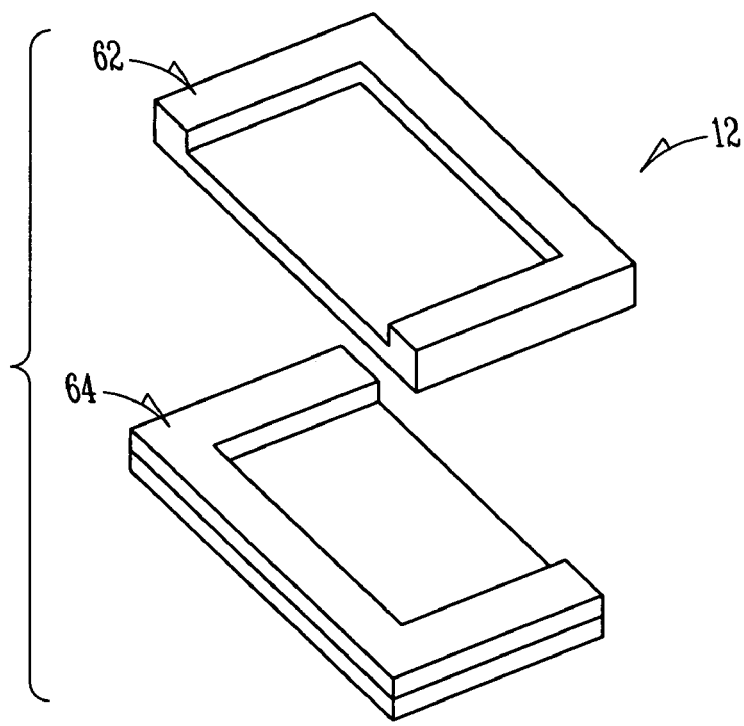
FIG. 8 depicts an exploded perspective view of a unit fuel cell constructed from two frames.

FIG. 8 depicts an exploded perspective view of a unit fuel cell (12) constructed from two frames (62 and 64). Each frame serves as a process layer and as a perimeter barrier and contains a formed cavity. The two process layers can have different functions in this embodiment, for example the first process layer can serve to be electrically conductive and the second process layer can serve to be electrically insulating. In one embodiment, at least one frame is preferably made ionically conductive by either forming the frame from an ionic conductor or rendering a portion of a non-conducting frame ionically conductive.

Each unit fuel cell can be made of one or more frames (62 and 64). The frames can be made of one material, so that the frames can function as both a perimeter barrier and as a process layer.

The frames which are made from one material can be made by stamping, embossing, ablating, machining, molding, casting, water jetting, or otherwise gouging, or chemically etching a substrate. Typical substrates can be stainless steel, Nafion™ a composite, a metal filled composite, electrolyte filled composites, or combinations of these.

The frames can selectively be porous and used within the scope of this invention. Preferably, the frames are the same dimension as the components of the unit fuel cells which they replace. Two types of frames can be used on the fuel cell, an electronically conducting frame and an ionically conducting frame. The electronically conducting frame is made from an electronically conducting material or alternatively, is made conductive by filling a porous region with a nonporous conductive material. The ionically conductive frame is made from an ionic conductor, such as Nafion™ from DuPont and if Nafion™ is used, then the perimeter barrier if also formed from Nafion™. Alternatively, the frame material can be made from electrically insulating material such as polyethylene with a porous region that has been filled with Nafion™ to render the region ionically conductive. The frames can be made of identical materials or the frame can each have a different material.

The frames are typically one piece structures to advantageously reduce the number of parts. The one piece construction also makes it simpler to align a fuel cell unit to form the fuel cell assembly making the process for making fuel cell assemblies cheaper and quicker than those currently available. By using a one piece construction of frames, there is no need for the extra step of bonding dissimilar materials together such as bonding a perimeter barrier material to a process layer material. Thus a fuel cell assembly using frames will have better integrity and fewer maintenance issues than multipart constructions.

Figure 9:
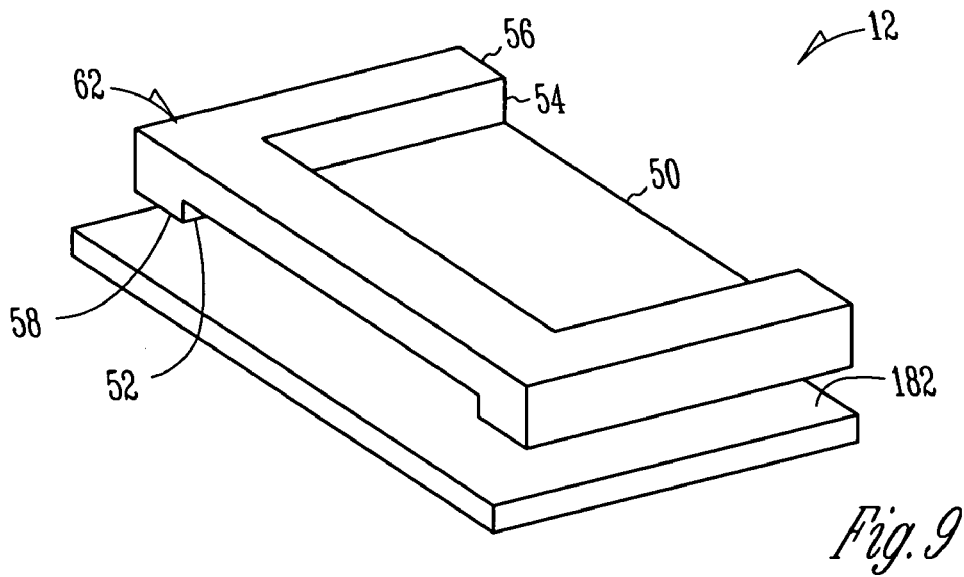
FIG. 9 depicts a view of two unit fuel cells, each with two frames and two reactant plenums embedded in each frame and two cavities.

FIG. 9 is a perspective view of a unit fuel cell (12) with one frame (62), two cavities (52 and 54) and a back process layer (50). In particular, the unit fuel cell (12) has a frame (62), a first cavity (52), and a second cavity (54). The cavities are surrounded by integral perimeter barriers (56 and 58). The unit fuel cell (12) is completed by joining the frame (62) to a second process layer (182).

Figure 10:
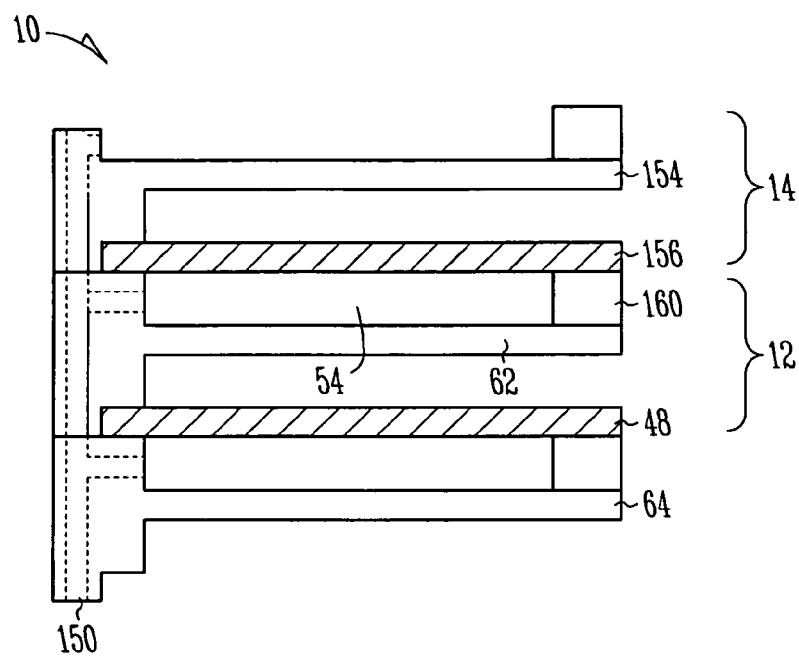
FIG. 10 depicts a cross sectional view of two unit fuel cells, each with a portion of a reactant plenum embedded in the frames.

FIG. 10 shows a cross-sectional view of a fuel cell assembly (10) with two unit fuel cells (12 and 14) and a portion of a reactant plenum (150) embedded in three frames (62, 64, and 154). In this embodiment, the two unit fuel cells (12 and 14) are connected by the frames (62 and 154) and the back perimeter barrier (160). The notion of a common plenum on one side of the fuel cell assembly advantageously enables one reactant to be fed in a controlled manner while the other reactant plenum is open to the environment. Preferably the common plenum is the fuel plenum.

Ionically conductive process layer (48) and conductive process layer (156) are used in the unit fuel cells.

Figure 11:
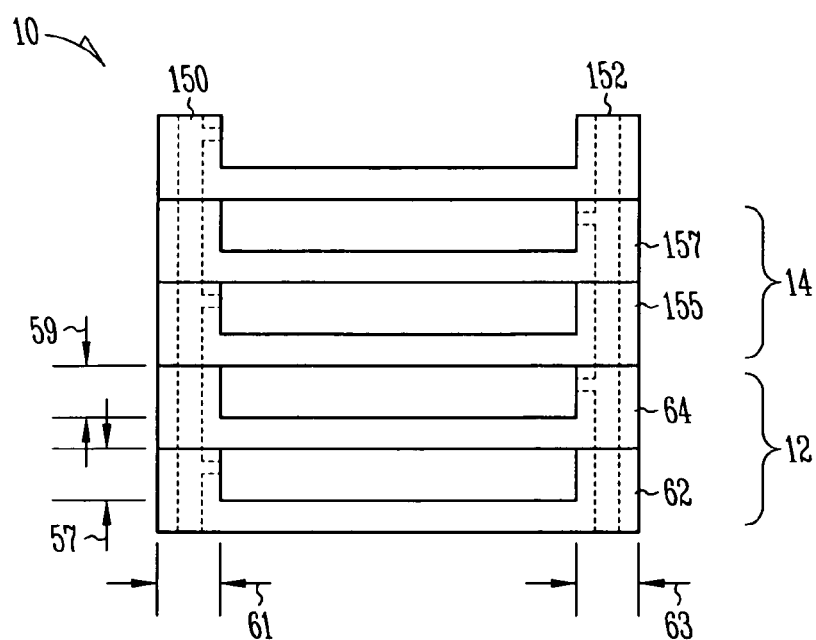
FIG. 11 depicts two unit fuel cells with two frames with embedded plenums.

FIG. 11 shows a fuel cell assembly (10) embodiment of two unit fuel cells (12 and 14), each with two reactor frames (62, 64, 155 and 157, respectively). The reactor frames can be used to house or embed one or more of the reactant plenums. This Figure also depicts a portion of the two reactant plenums (150 and 152) embedded in each reactor frame (62, 64, 155, and 157) similar to FIG. 10.

FIG. 11 also shows that the perimeter barriers used on the process layers of the unit fuel cells have dimensions of height and width. The front and back perimeter barrier height (57 and 59) respectively have a preferred dimension ranging from 100 nanometers to 10 millimeters. The front and back perimeter barrier width (61 and 63) respectively have a preferred dimension ranging from 10 nanometers to 5 millimeters. In still another embodiment, the front and back perimeter barrier widths can vary, being less on one portion of the perimeter barrier and greater on another portion of the perimeter barrier.

Figure 12:
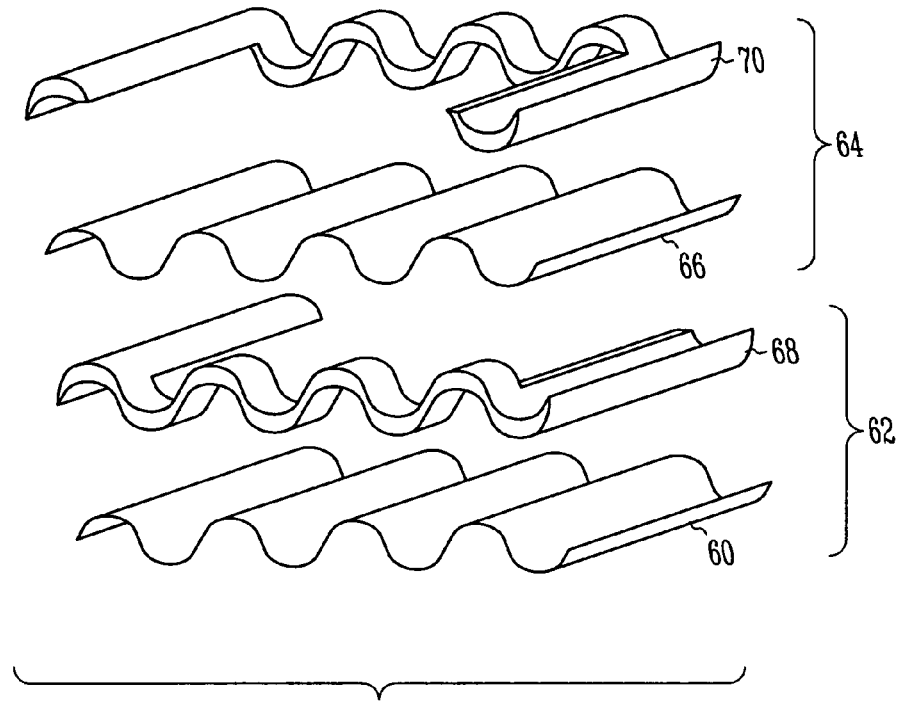
FIG. 12 depicts an undulating fuel cell.

FIG. 12 shows a frame (62) with an undulating process layer (60) and perimeter barrier (68). The surface area of the process layer is increased with the undulating construction, thereby increasing the capacity of the fuel cell assembly for the amount of reaction that can be done. FIG. 12 also shows a second frame (64) with an undulating process layer (66) and perimeter barrier (70).

Undulating in the context of this application refers to non-planar process layers, such as layers which are sinusoidal in shape, or arcs, or irregular in some other manner. It is contemplated that some of the process layers can be undulating while remaining process layers can be planar and still form a usable fuel cell assembly.

Figure 13:
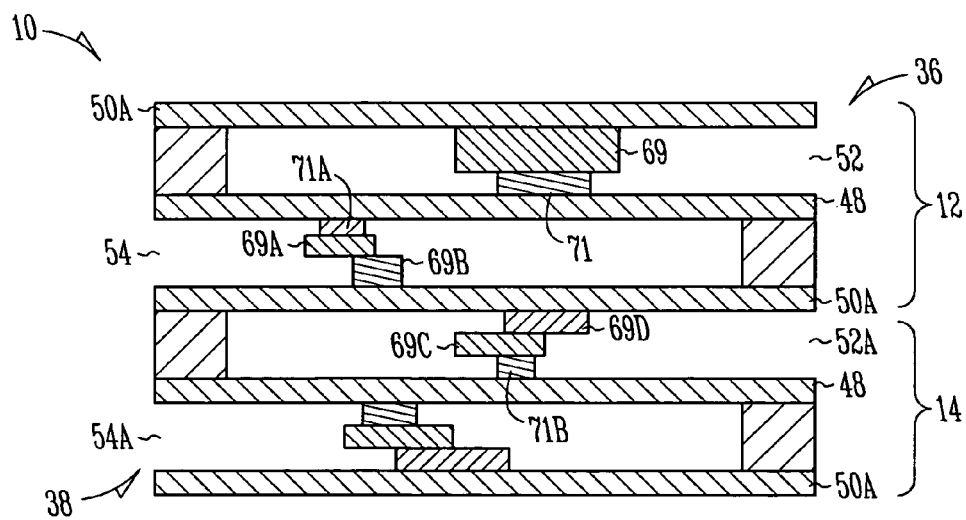
FIG. 13 depicts a schematic view of a portion of a bipolar fuel cell assembly with frames.

FIG. 13 depicts a schematic view of a bipolar fuel cell assembly (10) with frames showing two unit fuel cells (12 and 14) connected in a bipolar manner. When forming a bipolar fuel cell assembly, each unit fuel cell comprises one process layer that is ionically conductive (48) and one process layer that is electronically conductive (50a).

In a bipolar configuration, as shown in FIG. 13, the porous conductive layer (69) electrically connects the catalyst layer (71) to the electronically conductive process layers (50A). The catalyst layers (71, 71a, and 71b) connects directly to the ionically conductive process layer (48). The porous layer can be made of at least two layers of differing porous materials (69a, 69b, 69c, and 69d), which electrically connects the catalyst layer (71a and 71b) to the electronically conductive process layer (50a), enabling current to flow between electrodes of adjacent unit fuel cells (12 and 14). Also shown in FIG. 13 is front cavities (52, 52A), back cavities (54, 54A), and reactant plenums (36, 38).

Figure 14:
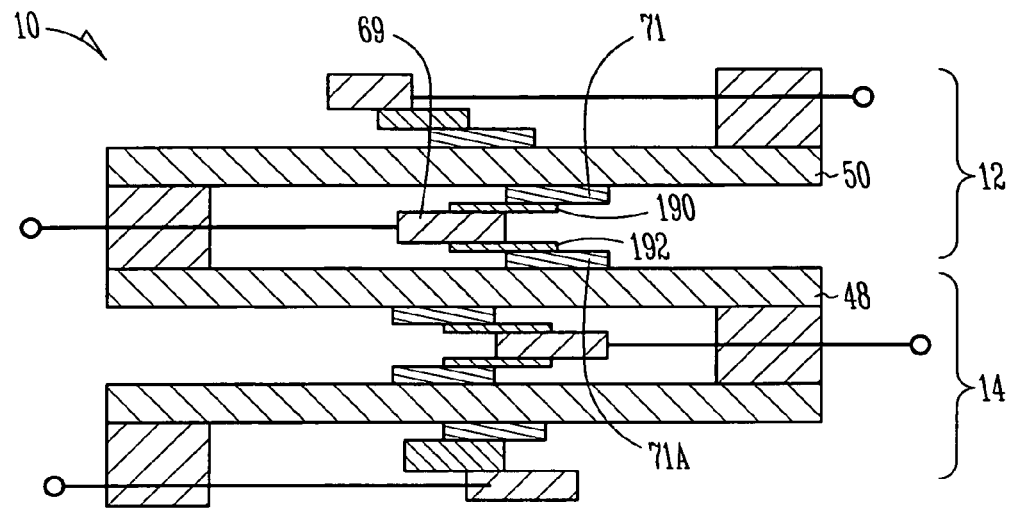
FIG. 14 is a schematic view of a portion of a unipolar edge collected fuel cell assembly with frames.

FIG. 14 depicts a cross sectional schematic of an alternate embodiment of the fuel cell assembly showing two unit fuel cells (12 and 14) with frames connected in an edge collected manner. In this embodiment, both of the process layers of the unit fuel cells are ionically conducting process layer. In this embodiment the catalyst layers (71 and 71a) adjoin the process layers (48 and 50) to form two identical polarity electrodes (190 and 192). The current flowing into or out of the identical polarity electrodes (190 and 192) passes through at least one porous conductive layer (69). The flow of current through the porous conductive layers creates an edge collected uni-polar fuel cell assembly (10).

The catalyst layer of either the bipolar or edge collected configuration can be composed of a noble metal catalyst, a transition metal catalyst, alloys thereof and combinations thereof. The catalyst layer can be a carbon supported catalyst or a thin film catalyst formed by spraying, sputtering, electroplating, printing, pulsed laser deposition, or combinations thereof. Alternatively, the catalyst layer can be cracked.

Figure 15:
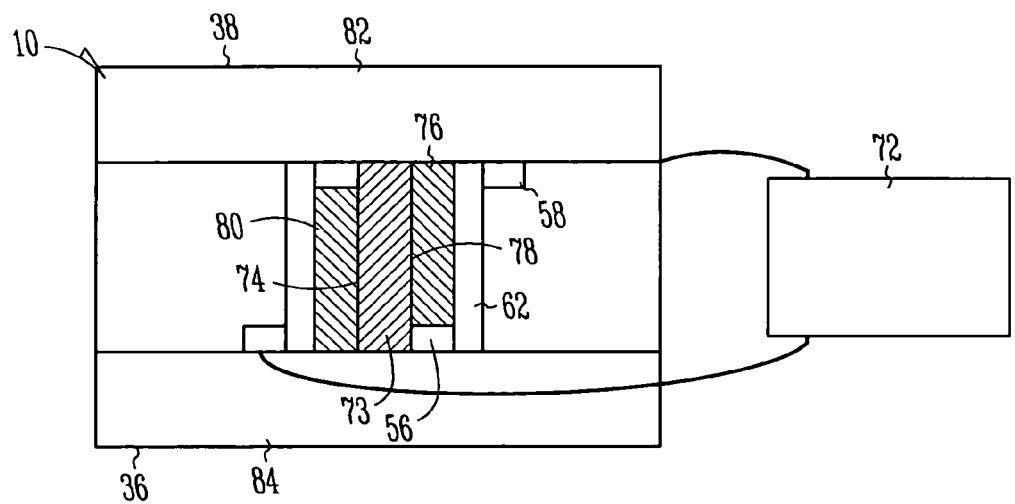
FIG. 15 is a view of an electrical appliance using the fuel cell assembly of the invention.

FIG. 15 depicts an embodiment wherein the fuel cell assembly (10) is a frame based fuel cell assembly used in conjunction with an electrical appliance (72). The electrical appliance (72) uses the fuel cell assembly (10) as a source of electrical power.

In this embodiment, the unit fuel cells each comprise one or more process layers of electrolyte (73). One or more of the cavities include a first catalyst (74) forming at least one anode (80). One or more other cavities include a second catalyst (78) forming at least one cathode (76). The anode (80) and the cathode (76) are disposed on either side of the electrolyte (73). The frame (62) serves as a separator between unit fuel cells as well as forming the two perimeter barriers (56 and 58).

One of the reactant plenums (38) contains an oxidant (82), such as oxygen, and the other reactant plenums (36) contain a fuel (84), such as hydrogen. The anode (80) and the cathode (76) connect to the electrical appliance and provide power.

The embodiments have been described in detail with particular reference to certain preferred embodiments thereof, but it will be understood that variations and modifications can be effected within the scope of the embodiments, especially to those skilled in the art.

What is claimed is:

1. A fuel cell assembly having a first face and a second face, the assembly comprising at least two fuel cell units disposed adjacent one another, wherein each fuel cell unit comprises:
    (a) a first process layer
    (b) a second process layer;
    (c) a first perimeter barrier disposed between the first and second process layers, wherein the first perimeter barrier and the first and second process layers are arranged to define a first cavity, the first cavity having an opening in communication with the first face;
    (d) a second perimeter barrier disposed between the second process layer and a first process layer of an adjacent fuel cell unit, wherein the second perimeter barrier, the second process layer, and the first process layer of the adjacent fuel cell unit are arranged to define a second cavity, the second cavity having an opening in communication with the second face;
    wherein one of the first or second process layers is adapted to be coupled with at least one of the first or second perimeter barriers of the corresponding fuel cell unit to form a frame.

2. The fuel cell assembly of claim 1, wherein the first process layer is adapted to be coupled with the corresponding first and second perimeter barriers to form the frame.

3. The fuel cell assembly of claim 1, wherein the first process layer is adapted to be coupled with the corresponding first perimeter barrier to form a first frame, and the second process layer is adapted to be coupled with the corresponding second perimeter barrier to form a second frame.

4. The fuel cell assembly of claim 1, wherein the first or second process layer and the at least one perimeter barrier adapted to be coupled to form the frame comprise the same material.

5. The fuel cell assembly of claim 1, wherein the frame comprises a one piece structure.

6. The fuel cell assembly of claim 1, wherein the first and second perimeter barriers are substantially impermeable to one or more reactants used in operation of the fuel cell assembly.

7. The fuel cell assembly of claim 1, further comprising a first reactant plenum in fluid communication with the first face.

8. The fuel cell assembly of claim 7, wherein the first reactant plenum comprises a fuel plenum.

9. The fuel cell assembly of claim 7, further comprising a second reactant plenum in fluid communication with the second face, wherein the first reactant plenum comprises a fuel plenum and the second reactant plenum comprises an oxidant plenum.

10. The fuel cell assembly of claim 9, wherein the fuel plenum comprises a fuel, the oxidant plenum comprises an oxidant, and the first and second perimeter barriers, at least in part, inhibit the mixing of the fuel and the oxidant.

11. The fuel cell assembly of claim 9, wherein one or both of the fuel or the oxidant plenum comprise an enclosed structure.

12. The fuel cell assembly of claim 9, wherein the first and second process layers permit a transport process between the first and second reactant plenums.

13. The fuel cell assembly of claim 7, wherein the at least two fuel cell units surround and define a shape of the first reactant plenum.

14. The fuel cell assembly of claim 7, wherein at least a portion of the first reactant plenum is embedded with the frame.

15. The fuel cell assembly of claim 1, wherein the second face and the second cavity are in communication with ambient air.

16. The fuel cell assembly of claim 1, wherein an outward orientation of the first face opposes an outward orientation of the second face.

17. The fuel cell assembly of claim 1, wherein the first and second faces are substantially planar and parallel to one another.

18. The fuel cell assembly of claim 1, wherein the fuel cell assembly comprises a thin flat construction.

19. The fuel cell assembly of claim 1, wherein the fuel cell assembly comprises a thin curvilinear construction.

20. The fuel cell assembly of claim 1, wherein the at least two fuel cell units are orthogonally disposed around a central axis.

21. The fuel cell assembly of claim 1, wherein the at least two fuel cell units are disposed parallel to a central axis.

22. The fuel cell assembly of claim 21, wherein the at least two fuel cell units comprise an annular shape.

23. The fuel cell assembly of claim 1, wherein a first fuel cell unit is disposed at a first angle to an adjacent fuel cell unit and a second fuel cell unit is disposed at a second angle to the first fuel cell unit, and wherein the first angle is different from the second angle.

24. The fuel cell assembly of claim 1, further comprising a plurality of fuel cell units formed into a plurality of groups including parallel fuel cell units, wherein each group is disposed at an arbitrary angle to an adjacent group.

25. The fuel cell assembly of claim 1, wherein the fuel cell assembly has a three-dimensional shape selected from the group consisting of: a cylinder, a prismatic shape, a box-like construction, or an irregular shape.

26. The fuel cell assembly of claim 1, wherein the first and second process layers are adapted to permit a transport process between the first and second cavities.

27. The fuel cell assembly of claim 1, wherein the first and second process layers are substantially impermeable to one or more reactants used in operation of the fuel cell assembly.

28. The fuel cell assembly of claim 1, wherein at least the first process layer is ionically conductive.

29. The fuel cell assembly of claim 28, wherein the first process layer comprises an ion-conducting material selected from the group consisting of: a proton exchange membrane, an electrolyte filled micro-porous structure, a liquid electrolyte trapped in a mesh, or combinations thereof.

30. The fuel cell assembly of claim 1, wherein the first and second process layers are ionically conductive.

31. The fuel cell assembly of claim 1, wherein the second process layer is electrically conductive.

32. The fuel cell assembly of claim 31, wherein the second process layer comprises a metal.

33. The fuel cell assembly of claim 31, wherein the second process layer comprises an electrically conductive composite material.

34. The fuel cell assembly of claim 31, wherein the second process layer comprises an electrically conductive material selected from the group consisting of: a metal, a filled metal composite, a filled micro-structure of polymer, a filled epoxy composite, a graphite composite, or one or more combinations thereof.

35. The fuel cell assembly of claim 1, wherein the first process layer is ionically conductive and the second process layer is electrically conductive.

36. The fuel cell assembly of claim 1, wherein a thickness of the first process layer is between 1 nanometer and 2 centimeters and a thickness of the second process layer is between 1 nanometer and 2 centimeters.

37. The fuel cell assembly of claim 1, wherein a thickness of the first process layer is different than a thickness of the second process layer.

38. The fuel cell assembly of claim 1, wherein at least one of the first or second process layers comprise more than one layer.

39. The fuel cell assembly of claim 1, wherein at least one of the first or second process layers comprise a non-planar shape.

40. The fuel cell assembly of claim 1, wherein the first and second cavities are at least partially filled with a porous media.

41. The fuel cell assembly of claim 1, wherein the first and second cavities comprise a catalyst layer disposed adjacent one or both of the first or second process layers and a porous electrically conductive material in electrical communication with the catalyst layer.

42. The fuel cell assembly of claim 1, wherein a height of the first cavity, defined by a distance between the first and second process layers, is less than a depth or a width of the first cavity.

43. The fuel cell assembly of claim 42, wherein the height of the first cavity is between 100 nanometers and 10 millimeters.

44. The fuel cell assembly of claim 42, wherein a height of the second cavity, defined by a distance between the second process layer and the process layer of the adjacent fuel cell unit, is less than a depth or a width of the second cavity.

45. The fuel cell assembly of claim 44, wherein the first and second cavities differ in at least one of their corresponding height, depth, or width dimensions.

46. The fuel cell assembly of claim 44, wherein the height of the second cavity is between 100 nanometers and 10 millimeters.

47. A method of operating a fuel cell assembly having a first face and a second face, the assembly comprising at least two fuel cell units disposed adjacent one another, wherein each fuel cell unit comprises a first process layer; a second process layer; a first perimeter barrier disposed between the first and second process layers, wherein the first perimeter barrier and the first and second process layers are arranged to define a first cavity, the first cavity having an opening in communication with the first face; a second perimeter barrier disposed between the second process layer and a first process layer of an adjacent fuel cell unit, wherein the second perimeter barrier, the second process layer, and the first process layer of the adjacent fuel cell unit are arranged to define a second cavity, the second cavity having an opening in communication with the second face; wherein one of the first or second process layers is adapted to be coupled with at least one of the first or second perimeter barriers of the corresponding fuel cell unit to form a frame, the method comprising:

supplying a fuel stream to the first cavity.

48. The method of claim 47, wherein the fuel stream comprises a fuel selected from the group consisting of hydrogen, ammonia, methanol, ethanol, butanol, formic acid, propane, butane, methane, a liquid phase hydrocarbon, a gas phase hydrocarbon and combinations thereof.

49. The method of claim 47, wherein the fuel stream is a hydrogen-containing reformate stream.

50. The method of claim 47, wherein the fuel stream is a liquid stream.

51. The method of claim 47, the method further comprising exposing the second cavity to ambient air.

52. The method of claim 47, the method further comprising supplying an oxidant stream to the second cavity.

53. A method of operating a fuel cell assembly having a first face and a second face, the assembly comprising at least two fuel cell units disposed adjacent one another, wherein each fuel cell unit comprises a first process layer; a second process layer; a first perimeter barrier disposed between the first and second process layers, wherein the first perimeter barrier and the first and second process layers are arranged to define a first cavity, the first cavity having an opening in communication with the first face; a second perimeter barrier disposed between the second process layer and a first process layer of an adjacent fuel cell unit, wherein the second perimeter barrier, the second process layer, and the first process layer of the adjacent fuel cell unit are arranged to define a second cavity, the second cavity having an opening in communication with the second face; wherein one of the first or second process layers is adapted to be coupled with at least one of the first or second perimeter barriers of the corresponding fuel cell unit to form a frame, the method comprising: supplying respective reactant streams to the respective first and second cavities, wherein the reactant streams move in and out of the corresponding cavity via diffusion.

54. A method of operating a fuel cell assembly having a first face and a second face, the assembly comprising at least two fuel cell units disposed adjacent one another, wherein each fuel cell unit comprises a first process layer; a second process layer; a first perimeter barrier disposed between the first and second process layers, wherein the first perimeter barrier and the first and second process layers are arranged to define a first cavity, the first cavity having an opening in communication with the first face; a second perimeter barrier disposed between the second process layer and a first process layer of an adjacent fuel cell unit, wherein the second perimeter barrier, the second process layer, and the first process layer of the adjacent fuel cell unit are arranged to define a second cavity, the second cavity having an opening in communication with the second face; wherein one of the first or second process layers is adapted to be coupled with at least one of the first or second perimeter barriers of the corresponding fuel cell unit to form a frame, the method comprising:

supplying respective reactant streams to the respective first and second cavities, wherein the reactant streams move in and out of the corresponding cavity via forced convection.

55. An electrical appliance comprising as a source of power, the fuel cell assembly according to claim 1.

56. The electrical appliance of claim 55, wherein the electrical appliance is an airplane, a car, a laser pointer, a cellular phone, a wireless phone, a projector, a television, a CD player, a radio, or a flashlight.

57. A fuel cell assembly having a first face and a second face, the assembly comprising a plurality of fuel cell units disposed adjacent one another, wherein each fuel cell unit comprises:

(a) an ionically conductive and electrically non-conductive first process layer;

(b) an electrically conductive second process layer;

(c) a first perimeter barrier disposed between the first and second process layers, wherein the first perimeter barrier and the first and second process layers are arranged to define a first cavity, the first cavity having an opening in communication with the first face;

(d) a second perimeter barrier disposed between the second process layer and a first process layer of an adjacent fuel cell unit, wherein the second perimeter barrier, the second process layer, and the first process layer of the adjacent fuel cell unit are arranged to define a second cavity, the second cavity having an opening in communication with the second face;

(e) the first and second cavities each containing a catalyst layer disposed adjacent to the corresponding cavity-forming first process layer, and a porous electrically conductive material electrically coupling the catalyst layer to the corresponding cavity-forming second process layer such that each fuel cell unit of the assembly is electrically coupled in series to the adjacent fuel cell unit; wherein one of the first or second process layers is adapted to be coupled with at least one of the first or second perimeter barriers of the corresponding fuel cell unit to form a frame; and wherein operation of the fuel cell assembly is bipolar.

58. The bipolar fuel cell assembly of claim 57, further comprising a first reactant plenum in fluid communication with the first face and a second reactant plenum in fluid communication with the second face.

59. The bipolar fuel cell assembly of claim 58, wherein the first reactant plenum comprises a fuel plenum and the second reactant plenum comprises an oxidant plenum.

60. An electrical appliance comprising as a source of power, the bipolar fuel cell assembly according to claim 57.

61. A fuel cell assembly having a first face and a second face, the assembly comprising a plurality of fuel cell units disposed adjacent one another, wherein each fuel cell unit comprises:

(a) a first and a second ionically conductive and electrically non-conductive process layer;

(b) a first perimeter barrier disposed between the first and second process layers, wherein the first perimeter barrier and the first and second process layers are arranged to define a first cavity, the first cavity having an opening in communication with the first face;

(c) a second perimeter barrier disposed between the second process layer and a first process layer of an adjacent fuel cell unit, wherein the second perimeter barrier, the second process layer, and the first process layer of the adjacent fuel cell unit are arranged to define a second cavity, the second cavity having an opening in communication with the second face;

(d) the first and second cavities each containing a catalyst layer disposed adjacent to the corresponding cavity-forming first and second process layers thereby forming two electrodes of the same polarity, and a current collector electrically coupled to at least one of the catalyst layers;

wherein one of the first or second process layers is adapted to be coupled with at least one of the first or second perimeter barriers of the corresponding fuel cell unit to form a frame; and wherein operation of the fuel cell assembly is unipolar.

62. The unipolar fuel cell assembly of claim 61, further comprising a first reactant plenum in fluid communication with the first face and a second reactant plenum in fluid communication with the second face.

63. An electrical appliance comprising as a source of power, the unipolar fuel cell assembly according to claim 61.

* * * * *